US011513191B2

(12) United States Patent
Braunreiter et al.

(10) Patent No.: US 11,513,191 B2
(45) Date of Patent: Nov. 29, 2022

(54) SYSTEM AND METHOD FOR PREDICTIVE COMPENSATION OF UPLINK LASER BEAM ATMOSPHERIC JITTER FOR HIGH ENERGY LASER WEAPON SYSTEMS

(71) Applicant: Raytheon Company, Waltham, MA (US)

(72) Inventors: Dennis Braunreiter, San Diego, CA (US); Daniel Young, Allen, TX (US)

(73) Assignee: Raytheon Company, Waltham, MA (US)

( * ) Notice: Subject to any disclaimer, the term of this patent is extended or adjusted under 35 U.S.C. 154(b) by 224 days.

(21) Appl. No.: 16/596,595

(22) Filed: Oct. 8, 2019

(65) Prior Publication Data

US 2021/0103032 A1    Apr. 8, 2021

(51) Int. Cl.
*H04N 5/225*  (2006.01)
*G01S 7/48*  (2006.01)
*F41G 3/14*  (2006.01)
*F41H 13/00*  (2006.01)
*G01S 7/497*  (2006.01)
(Continued)

(52) U.S. Cl.
CPC .......... *G01S 7/4804* (2013.01); *F41G 3/145* (2013.01); *F41H 13/005* (2013.01); *G01S 7/497* (2013.01); *G01S 17/66* (2013.01); *G02B 26/0816* (2013.01)

(58) Field of Classification Search
CPC ........ G01S 7/4804; G01S 7/497; G01S 17/66; F41G 3/145; F41H 13/005; G02B 26/0816
See application file for complete search history.

(56) References Cited

U.S. PATENT DOCUMENTS 5,557,347 A    9/1996  Johnson
5,780,839 A    7/1998  Livingston
(Continued)

FOREIGN PATENT DOCUMENTS

EP    2793191 A2    10/2014
JP    3041283 B2    5/2000
JP    2002051347 A    2/2002

OTHER PUBLICATIONS

International Search Report and Written Opinion of the International Searching Authority in connection with International Patent Application No. PCT/US2020/029619 dated Jul. 10, 2020, 8 pages.
(Continued)

*Primary Examiner* — Jonathan R Messmore

(57) ABSTRACT

A system includes a target illumination laser (TIL) configured to illuminate an airborne target with a TIL beam. The system also includes a beacon illuminator (BIL) configured to transmit a spot of illumination to an expected location on the target, wherein the spot of illumination is more focused than the TIL beam. The system also includes a camera configured to receive an image of the spot reflected off the target. The system also includes a controller configured to determine an actual location of the spot on the target based on the received image. The controller is also configured to estimate a spot motion by correlating the actual location of the spot on the target with the expected location on the target. The controller is also configured to predict uplink jitter of a high energy laser (HEL) beam generated by a HEL based on the BIL spot motion, the uplink jitter caused by atmospheric optical turbulence.

20 Claims, 5 Drawing Sheets

(51) Int. Cl.
*G01S 17/66* (2006.01)
*G02B 26/08* (2006.01)

(56) References Cited

U.S. PATENT DOCUMENTS

| | | | |
|---|---|---|---|
| 5,936,229 A | 8/1999 | Livingston | |
| 6,115,123 A * | 9/2000 | Stappaerts | G01S 7/486 |
| | | | 250/201.9 |
| 7,041,953 B2 | 5/2006 | Byren | |
| 3,049,870 A1 | 11/2011 | Mosier et al. | |
| 8,218,589 B1 * | 7/2012 | Saunders | G01S 17/66 |
| | | | 372/33 |
| 8,415,600 B2 | 4/2013 | Hutchin | |
| 8,853,604 B1 | 10/2014 | Barchers | |
| 9,368,936 B1 * | 6/2016 | Lenius | G01S 17/10 |
| 10,565,684 B2 | 2/2020 | Zhang et al. | |
| 11,017,560 B1 * | 5/2021 | Gafni | G06N 3/08 |
| 2006/0022115 A1 | 2/2006 | Byren | |
| 2006/0126952 A1 | 6/2006 | Suzuki et al. | |
| 2007/0217705 A1 | 9/2007 | Lee et al. | |
| 2009/0092337 A1 | 4/2009 | Nagumo | |
| 2012/0268309 A1 | 10/2012 | Samuel et al. | |
| 2013/0010100 A1 | 1/2013 | Kotaki et al. | |
| 2016/0086018 A1 * | 3/2016 | Lemoff | G06K 9/00288 |
| | | | 382/118 |
| 2016/0184924 A1 * | 6/2016 | Kalender | F41H 13/0062 |
| | | | 250/201.1 |
| 2016/0247262 A1 | 8/2016 | Li et al. | |
| 2016/0295208 A1 | 10/2016 | Beall | |
| 2017/0192094 A1 * | 7/2017 | Marron | G01S 17/58 |
| 2017/0261743 A1 * | 9/2017 | Kim | G05B 19/4099 |
| 2021/0156969 A1 * | 5/2021 | Levy | G01S 7/4816 |

OTHER PUBLICATIONS

International Search Report and Written Opinion of the International Searching Authority in connection with International Patent Application No. PCT/US2020/033176 dated Jul. 15, 2020, 10 pages.

Braunreiter et al., U.S. Appl. No. 16/702,279 entitled "Super-Resolution Automatic Target Aimpoint Recognition and Tracking", filed Dec. 3, 2019, 51 pages.

Higgs et al., "Atmospheric Compensation and Tracking Using Active Illumination," Lincoln Laboratory Journal, vol. 11, Nov. 1998, 22 pages.

Chen et al., "Advanced image registration techniques and applications," Proceedings of SPIE, SPIE Defense and Security Symposium, Apr. 2008, 15 pages.

Chen et al., "Advanced super-resolution image enhancement process," Proceedings of SPIE, Optical Engineering + Applications, Sep. 2008, 11 pages.

Braunreiter et al., U.S. Appl. No. 16/559,136 entitled "System and Method for Correcting for Atmospheric Jitter and High Energy Laser Broadband Interference Using Fast Steering Mirrors", filed Sep. 3, 2019, 29 pages.

Braunreiter et al., U.S. Appl. No. 16/674,995 entitled "Atmospheric Jitter Correction and Target Tracking Using Single Imaging Sensor in High-Energy Laser Systems", filed Nov. 5, 2019, 51 pages.

International Search Report dated Apr. 1, 2021 in connection with International Patent Application No. PCT/US2020/040571, 3 pages.

Written Opinion of the International Searching Authority dated Apr. 1, 2021 in connection with International Patent Application No. PCT/US2020/040571, 7 pages.

International Search Report dated Mar. 19, 2021 in connection with International Patent Application No. PCT/US2020/036675, 3 pages.

Written Opinion of the International Searching Authority dated Mar. 19, 2021 in connection with International Patent Application No. PCT/US2020/036675, 8 pages.

Office Action dated Jul. 1, 2021 in connection with U.S. Appl. No. 16/674,995, 14 pages.

Office Action dated Aug. 18, 2021 in connection with U.S. Appl. No. 16/702,279, 16 pages.

Skaloud et al., "Rigorous approach to bore-sight self-calibration in airborne laser scanning", International Society for Photogrammetry and Remote Sensing, Inc., Sep. 2006, 13 pages.

Office Action dated Nov. 30, 2021 in connection with U.S. Appl. No. 16/674,995, 16 pages.

Office Action dated Jan. 19, 2022 in connection with U.S. Appl. No. 16/702,279, 23 pages.

Advisory Action dated Feb. 11, 2022 in connection with U.S. Appl. No. 16/674,995, 6 pages.

Applicant-Initiated Interview Summary dated Feb. 15, 222 in connection with U.S. Appl. No. 16/702,279, 3 pages.

* cited by examiner

SYSTEM AND METHOD FOR PREDICTIVE COMPENSATION OF UPLINK LASER BEAM ATMOSPHERIC JITTER FOR HIGH ENERGY LASER WEAPON SYSTEMS

GOVERNMENT RIGHTS

This invention was made with U.S. government support under contract number W9113M-17-D-0006-0002 awarded by the Department of Defense. The U.S. government may have certain rights in this invention.

TECHNICAL FIELD

This disclosure is directed in general to laser weapon systems. More specifically, this disclosure relates to a system and method for predictive compensation of uplink laser beam atmospheric jitter for high energy laser weapon systems. This disclosure is also applicable to laser communications any other laser pointing or tracking system where atmospheric disturbances on beam pointing require mitigation to maintain beam on the target or sensor.

BACKGROUND

For high energy laser (HEL) tactical ground-to-air engagements with elevation angles greater than the horizon, HEL beam quality loss from atmospheric disturbances on the laser beam propagation is primarily due to atmospherically induced beam tip-tilt or jitter, in addition to optical transmission losses, versus higher order wavefront errors. Uncompensated HEL beam jitter decreases the HEL power on the intended target, which increases target kill times and reduces target kill probability. Compensation for the atmospheric jitter of the HEL is important to maximizing HEL power-on-target.

SUMMARY

This disclosure provides a system and method for predictive compensation of uplink laser beam atmospheric jitter for high energy laser weapon systems and any other laser pointing systems requiring mitigation of atmospheric disturbances to keep the laser pointed on a target location or sensor at a distance.

In a first embodiment, a system includes a target illumination laser (TIL) configured to illuminate an airborne target with a TIL beam. The system also includes a beacon illuminator (BIL) configured to transmit a spot of illumination to an expected location offset from a high energy laser (HEL) beam on the target, wherein the spot of illumination is more focused than the TIL beam. The system also includes a camera configured to receive an image of the spot reflected off the target. The system also includes a controller configured to determine an actual location of the spot on the target based on the received image. The controller is also configured to estimate a spot motion by correlating the actual location of the spot on the target with the expected location on the target. The controller is also configured to predict uplink jitter of the HEL beam generated by a HEL based on the spot motion of the BIL, wherein the uplink jitter is caused by atmospheric optical turbulence.

In a second embodiment, a method includes illuminating an airborne target with a TIL beam. The method also includes transmitting a spot of illumination to an expected location on the target, wherein the spot of illumination is more focused than the TIL beam. The method also includes receiving, at a camera, an image of the spot reflected off the target. The method also includes determining an actual location of the spot on the target based on the received image. The method also includes estimating a spot motion by correlating the actual location of the spot on the target with the expected location on the target. The method also includes predicting uplink jitter of a HEL beam generated by a HEL based on the spot motion, the uplink jitter caused by atmospheric optical turbulence.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

The figures described below and the various embodiments used to describe the principles of the present disclosure in this patent document are by way of illustration only and should not be construed in any way to limit the scope of the disclosure. Those skilled in the art will understand that the principles of the present disclosure may be implemented in any type of suitably arranged device or system.

For simplicity and clarity, some features and components are not explicitly shown in every figure, including those illustrated in connection with other figures. It will be understood that all features illustrated in the figures may be employed in any of the embodiments described. Omission of a feature or component from a particular figure is for purposes of simplicity and clarity and is not meant to imply that the feature or component cannot be employed in the embodiments described in connection with that figure.

Figure 1:
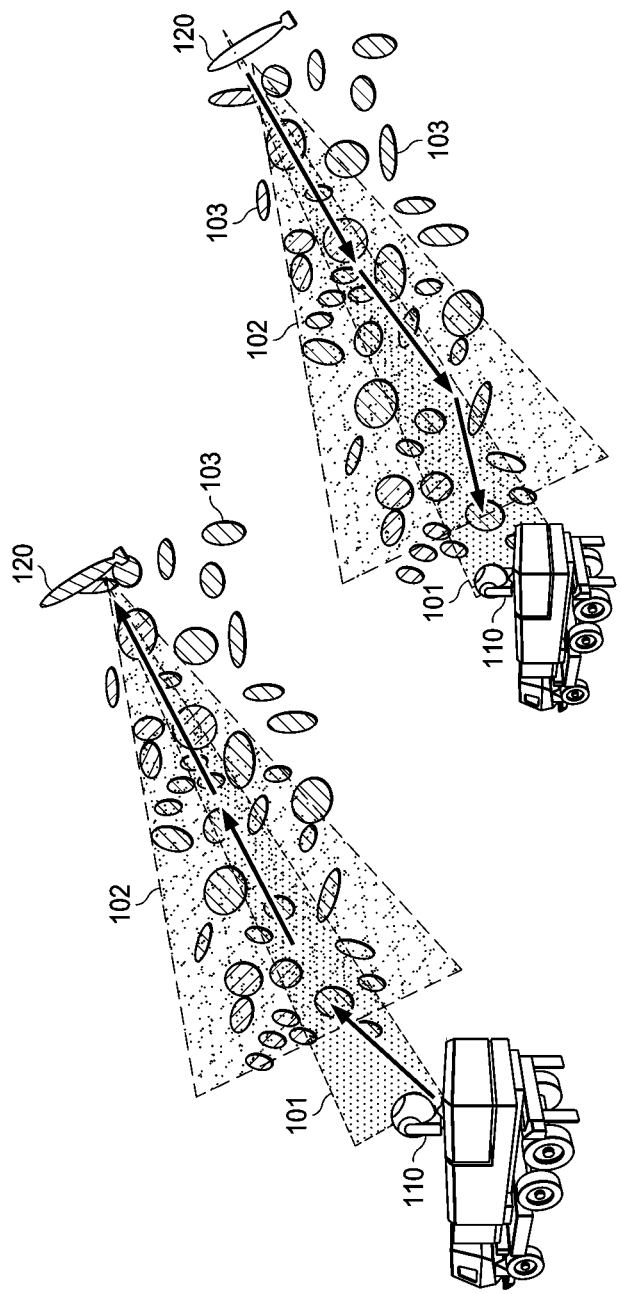
FIG. 1 illustrates examples of different kinds of atmospheric jitter.

As discussed above, compensation for atmospherically induced jitter in high energy laser (HEL) systems is critical to maximizing HEL power-on-target. Atmospheric jitter includes both downlink jitter and uplink jitter. FIG. 1 illustrates examples of both kinds of atmospheric jitter. As shown in FIG. 1, a focusing Gaussian uplink beam 101 is transmitted from a laser source 110 to a target 120. The diffuse surface of the target 120 spreads the beam 101, which results in a diverging downlink beam 102, which is a spherical wave or plane wave. Both the uplink beam 101 and the downlink beam 102 pass through cells 103 of optical turbulence, which act as small lenses that distort the beams 101-102.

As indicated by the arrows of the beam paths, the uplink beam 101 and the downlink beam 102 interact with different cells 103 of optical turbulence. Thus, the resulting jitter is different on the uplink than on the downlink. Typically, the uplink HEL beam jitter is the dominant atmospheric jitter effect contributing to atmospheric induced loss of power on target. For tactical ranges, the uplink jitter is different than the downlink jitter as seen by traditional tracking systems, since the uplink beam 101 is a focusing Gaussian beam, and the downlink beam 102 is a spherical wave or plane wave. Thus, current systems are unable to sense or compensate completely for the uplink jitter.

Optical turbulence in the atmosphere affects the propagation of a laser beam by distorting its wavefront profile, which in effect reduces the focused power on target. The wavefront errors introduced by optical turbulence are composed of multiple orders. The primary wavefront distortions are tip-tilt of beam jitter, and the other wavefront errors can be grouped in a category of higher order terms. This wavefront error decomposition comes from decomposing the wavefront into a Zernicke polynomial basis for example. For some look angles and engagements, the tip-tilt or jitter of the HEL beam is more significant than the higher order effects. This is the case for look-up from the horizon when engaging air targets from the ground. For horizontal targets and low elevation angles near surface target engagements, the higher order terms have a bigger impact than the tip-tilt.

Different compensation systems are sometimes used to address at least some portion of optically induced atmospheric wavefront error. One system is a target illumination laser (TIL) and imaging tracker with a fast steering mirror (FSM) for tip-tilt correction. Another system is a wavefront sensor and deformable mirror for higher order wavefront correction. The TIL approach to compensation is a more basic form of atmospheric tip-tilt correction, while the deformable mirror with adaptive optics (AO) compensation is employed on more advanced HEL systems. The TIL is used to illuminate the target in the short wave infrared (SWIR) band at an offset optical frequency for tip-tilt correction, since looking at any return from the HEL beam will quickly saturate an optical receiver. The received target return (downlink) from the TIL illumination is imaged by a SWIR camera that is aligned optically with the HEL beam. The jitter in the image seen in the TIL SWIR image is the downlink jitter from the atmosphere, target dynamics, and any residual opto-mechanical jitter. The jitter in the SWIR image is estimated with an imaging tracker that estimates the target position error on each frame relative to boresight as well as the targets aimpoint. The error estimates are then provided to a FSM that applies an opposite command of the HEL of the estimated boresight error from jitter.

The TIL approach to tip-tilt compensation is limited in three areas. The first is that jitter of the HEL beam going up (uplink) is greater than the downlink as seen by the TIL return for a focused Gaussian laser beam. The second is that the closed loop operation, servo delays, and the speed of light limit the speed at which the compensation is applied. The third is that the uplink jitter of the HEL is of a higher bandwidth than the downlink due to the beam wave interaction with the atmosphere. Importantly, the uplink jitter of the HEL Gaussian beam focused on the target for the up-looking ground to air engagements is greater than the downlink, and any boresight error correction from the TIL will not substantially remove the jitter that the HEL beam will experience on the uplink.

Adaptive optics (AO) are sometimes used to compensate for higher order HEL wavefront errors and are applied after the tip-tilt corrections are made with a TIL based tracker and FSM as discussed above. AO correction systems are non-imaging and use a focused beam or beacon illuminator (BIL) that is similar in optical frequency as the HEL, optically aligned to the HEL beam, mimicking the propagation of the HEL beam. The return of the spot beam off the target is sensed with a wavefront sensor (e.g., a Shack-Hartmann wavefront sensor), and the phase of the wavefront errors relative to a plane wave is estimated. The wavefront errors are applied to an array of deformable mirrors in the beam control system in a closed loop operation. However, AO correction systems do not measure the HEL uplink jitter errors from the atmosphere, and are limited in accuracy in correction due to target and BIL beam interaction and atmospheric effects. AO compensation systems are also limited in correction speed, similar to FSM-based HEL beam tip-tilt correction systems, due to round trip speed-of-light delays and deformable mirror driver latencies.

To address these issues, the embodiments described in this disclosure provide a system and method for predicting (i.e., estimating) and compensating for the uplink atmospheric jitter of an HEL beam. The uplink jitter is predicted based on the motion of an illuminated spot reflected off of the target that is provided by a BIL that is aligned to the HEL beam with a known adjustable angular offset. The BIL spot motion is seen by a SWIR camera that is also used to track the target, which is illuminated with a TIL broad beam.

An image returned from the target spot includes a target-referenced location of where the spot landed on the target due to boresight errors from the atmosphere on the uplink. An image tracker estimates the uplink motion of the target-referenced spot relative to one or more target features that are identified by image processing of the return image. Estimates of the spot motion from frame to frame are obtained by correlating the expected area of the spot location in the image with a reference image. The reference image is a recursively integrated, shift corrected spot image from prior frames.

A predictive estimator uses the spot motion estimates to predict the uplink beam jitter on the target when the HEL beam arrives. The prediction is forward in time, taking into account the round trip speed-of-light delay when the BIL reaches the target, and FSM servo and processing delays. Once the uplink beam jitter is predicted, a controller commands the FSM in the opposite direction of the predicted jitter, thereby zeroing out the uplink atmospheric jitter that is predicted to occur as the HEL beam approaches the target.

It will be understood that embodiments of this disclosure may include any one, more than one, or all of the features described here. Also, embodiments of this disclosure may additionally or alternatively include other features not listed here. While the disclosed embodiments may be described with respect to laser systems in military applications, these embodiments are also applicable in any other suitable systems or applications.

Figure 2:
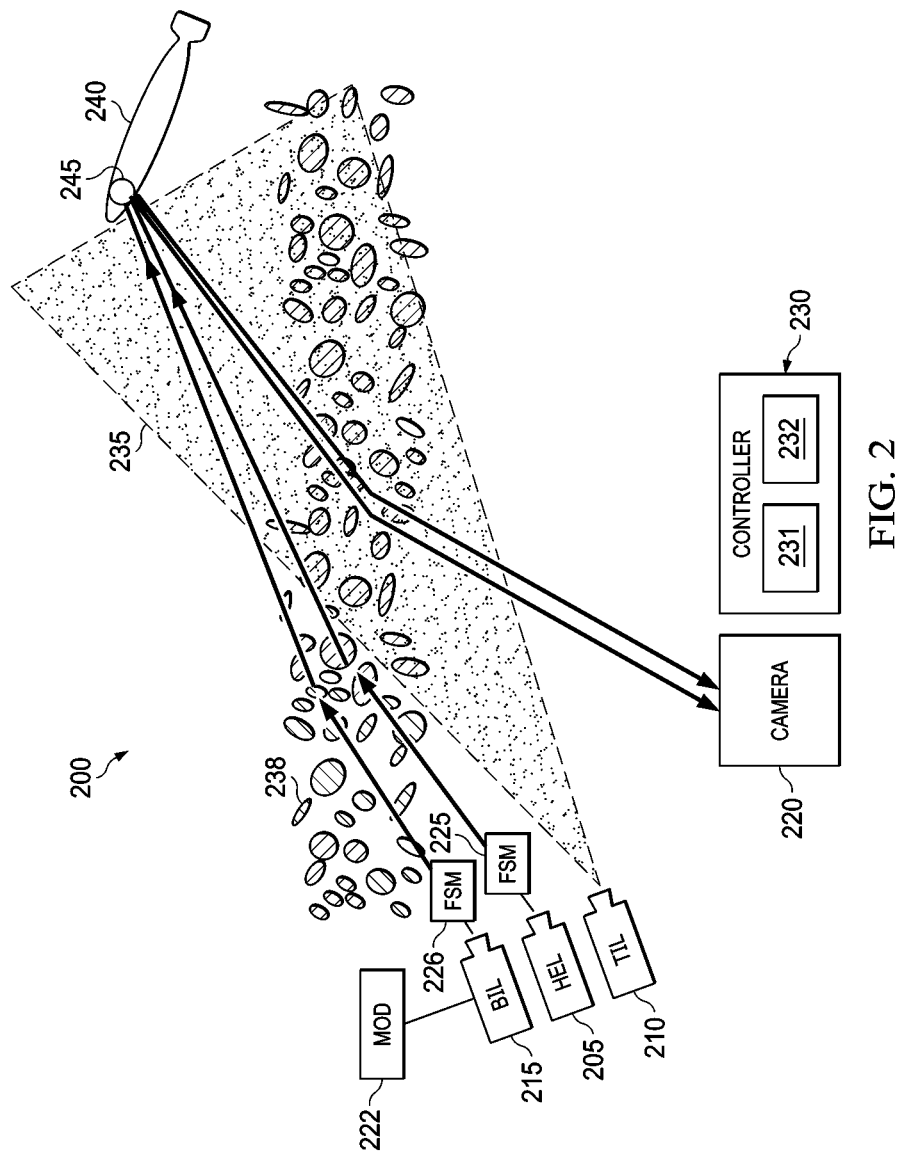
FIG. 2 illustrates an example system for predicting and compensating for the uplink atmospheric jitter of a high energy laser beam according to this disclosure.

FIG. 2 illustrates an example system 200 for predicting and compensating for the uplink atmospheric jitter of an HEL beam according to this disclosure. As discussed above, the compensation for the uplink jitter is based on "seeing" a HEL-like spot on the target, and closing errors of the spot motion with predictive compensation and a separate FSM in the common optical path, in order to zero out the HEL beam jitter on the target. As shown in FIG. 2, the system 200 includes a HEL 205, a TIL 210, a BIL 215, a camera 220, multiple FSMs 225-226, and a controller 230.

The HEL 205 is configured to generate a high energy laser beam that is aimed toward a target 240. The TIL 210 is configured to illuminate the target 240 with an illumination beam 235, and can be used to measure the distance and angle of the target 240 relative to the HEL 205. In some embodiments, the TIL 210 generates an illumination light at a wavelength of approximately 1575 nm. However, this wavelength is merely one example, and in other embodiments, the illumination light could be at a longer or shorter wavelength.

The BIL 215 is configured to generate a more focused illumination spot 245 on the target 240. A particular intended location on the target 240 is selected to be illuminated by the BIL spot 245. For example, it may be predetermined to illuminate a particular feature on the nose of the target 240. As shown in FIG. 2, the BIL spot 245 is subject to optical turbulence 238 in the atmosphere, which results in uplink jitter of the BIL spot 245. The actual location of the BIL spot 245 on the target 240 relative to the intended or expected location of the BIL spot 245 on the target 240 is used to determine the uplink jitter. In some embodiments, the BIL spot 245 is at a wavelength of approximately 1005 nm. However, this wavelength is merely one example, and in other embodiments, the BIL spot 245 could be at a longer or shorter wavelength.

The BIL 215 and the HEL 205 are on the same optical path; as a result, correction of the BIL uplink jitter also substantially corrects the HEL uplink jitter. The optical frequency of the BIL 215 is close to the optical frequency of the HEL 205; thus, the two experience approximately the same uplink jitter.

The camera 220 is a high-speed SWIR camera co-boresighted with the HEL 205. The camera 220 is configured to receive and process images from the target 240. In particular, the camera 220 receives images that illustrate motion of the BIL spot 245 caused by atmospheric jitter. In some embodiments, one camera 220 is used for both TIL tracking of the target 240 and tracking of the BIL spot 245. In other embodiments, these functions can be performed by separate cameras 220. In embodiments where the return images from the BIL 215 and the TIL 210 are processed by a single camera 220, an acoustic optical modulator 222 can be used to modulate the BIL 215 so that TIL-only imagery can be processed separately by the camera 220.

The FSMs 225-226 are disposed outside of the common optical path, and operate to bias the uplink beam from the BIL 215 to a different location than the HEL 205. Prior to engaging the function for atmospheric uplink jitter correction, the TIL tracker function of the controller 230 is used to stabilize the HEL 205 and the line of sight on the target 240 using the downlink imagery and a separate FSM associated with the TIL track. This ensures that the beam from the BIL 215 is on the target 240 once engaged. The BIL spot 245 on the target 240 is the location where the HEL beam from the HEL 205 arrives based on boresight errors that include atmospheric uplink tip-tilt or jitter. A return from the BIL spot 245 includes a target-referenced location of where the spot 245 landed on the target 240 due to boresight errors. The spot 245, including its sidelobes, is quite broad spatially at the target 240 at tactical ranges and covers the target 240 and/or target-like features with high enough amplitude to generate an image that can be interpreted.

The controller 230 performs an imaging tracking algorithm to estimate the uplink motion of the target-referenced spot 245 relative to one or more features on the target 240 (such as the target nose) identified with morphological image processing of the return image. Estimates of the motion of the spot 245 from frame to frame are obtained by correlating the expected area of the spot location in the image with a reference image. The reference image is a recursively integrated, shift corrected spot image from prior frames. The controller 230 performs a predictive estimation algorithm that uses the spot motion estimates to predict the uplink beam jitter on the target 240 when the HEL beam arrives from the HEL 205. The prediction is forward in time, taking into account the round trip speed-of-light delay of the BIL spot 245 reaching the target 240 and returning, and FSM servo and processing delays. The controller 230 then controls one or both FSMs 225-226 in the opposite direction of the predicted jitter. The FSMs 225-226 move in the opposite direction of the predicted jitter, thereby zeroing out the uplink atmospheric jitter boresight errors at the time when the HEL beam from the HEL 205 reaches the target 240.

The controller 230 can be programmable, and can include any suitable combination of hardware, firmware, and software for image tracking, predictive estimation, and control of other components, including the FSMs 225-226. For example, the controller 230 could denote at least one processor 231 configured to execute instructions obtained from at least one memory 232. The controller 230 may include any suitable number(s) and type(s) of processors or other computing or control devices in any suitable arrangement. Example types of controllers 230 include microprocessors, microcontrollers, digital signal processors, field programmable gate arrays, application specific integrated circuits, and discrete circuitry. In some embodiments, the operations of the controller 230 described herein may be divided and performed by two or more separate controllers 230.

An autoregressive input-output model can be used to characterize the uplink jitter from the spot motion estimates since there is no dynamical model of the optical turbulence in the atmosphere. The autoregressive input-output model is multi-pole. The autoregressive model coefficients are estimated on-line (e.g., by the controller 230) using least squares correlation estimation in a sliding window, and updated every time step or image. Since the atmospheric uplink jitter is band-limited to frequencies <250 Hz with $f^{\wedge}(-5/3)$ temporal frequency roll-off, sampling the motion of the atmosphere at high speed enables accurate prediction out to many time steps (or images) in the future. The accuracy of the autoregressive model prediction, as with any predictive technique (like a Kalman filter), may degrade with further look ahead. When a single camera 220 is used for capturing return images from both the TIL 210 and the BIL 215, the TIL track and BIL processing can be optimized to minimize total uplink jitter and keep the BIL 215 pointed on the target 240. In some embodiments, the speed of the camera 220 for tactical ground to air scenarios is approximately 2 KHz, whereas the TIL 210 can operate at 500 Hz or less to maintain initial pointing accuracy. The high speed of 2 KHz keeps the prediction errors small.

Although FIG. 2 illustrates one example system 200 for predicting and compensating for the uplink atmospheric jitter of an HEL beam according to this disclosure, various changes may be made to FIG. 2. In general, the makeup and arrangement of the system 200 are for illustration only. Components could be added, omitted, combined, or placed in any other configuration according to particular needs.

Figure 3:
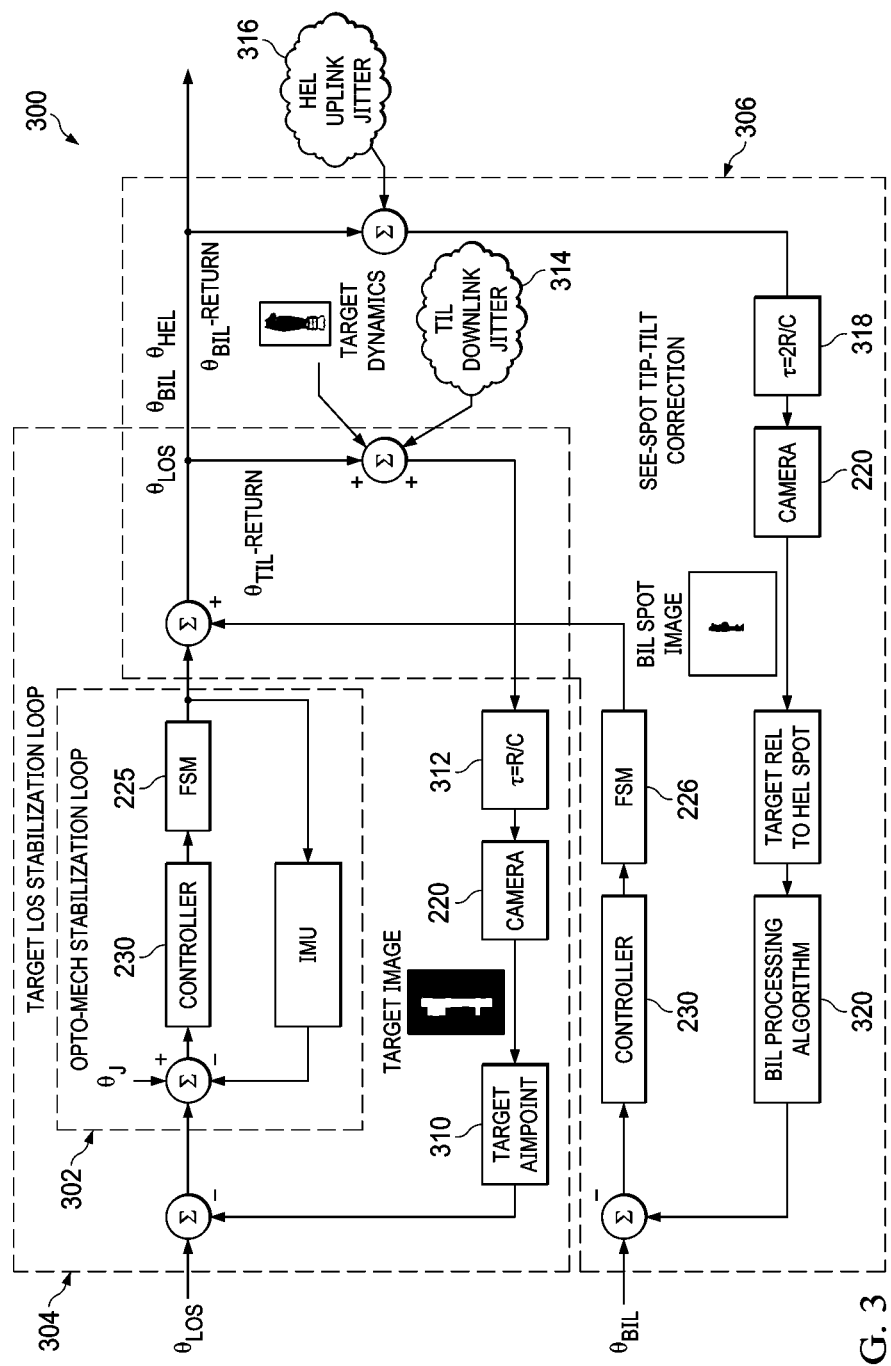
FIG. 3 illustrates a control loop of prediction and compensation operations performed by the system of FIG. 2 according to this disclosure.

FIG. 3 illustrates a control loop 300 of prediction and compensation operations performed by the system 200 according to this disclosure. In some embodiments, the control loop 300 is performed by the controller 230 using one or more prediction and compensation algorithms. In other embodiments, the control loop 300 can be performed by multiple controllers and/or other components of the system 200.

As shown in FIG. 3, the control loop 300 includes three lower-level loops, including an opto-mechanical stabilization loop 302, a target line-of-sight (LOS) stabilization loop 304, and a tip-tilt correction loop 306.

The function of the opto-mechanical stabilization loop 302 is to stabilize the pointing of the laser relative to the line of sight from movement caused by mechanical vibration of the overall system, such as platform vibration. This mechanical vibration (also referred to as mechanical jitter) is represented in FIG. 3 as $\theta_J$. In the opto-mechanical stabilization loop 302, the controller 230 receives the mechanical vibration $\theta_J$ and the line of sight of the camera 220, represented by $\theta_{LOS}$, to determine the compensation needed for correction. Based on the determined compensation, the controller 230 controls the FSM 225 to adjust the line of light.

The target LOS stabilization loop 304 stabilizes the return off the target 240 from the TIL 210. This TIL return is affected by atmospheric downlink jitter 314. The target LOS stabilization loop 304 senses the downlink jitter 314 and compensates for the downlink jitter 314. In the target LOS stabilization loop 304, the target aimpoint 310 indicates where the illumination of the TIL 210 is aimed toward the target 240. A downlink time delay 312 is added to the downlink jitter 314. The downlink time delay 312 is a measure of the inherent speed-of-light time delay in the downlink for the spot 245 to reflect off the target 240 and be received at the camera 220.

The tip-tilt correction loop 306 corrects for the effect of atmospheric uplink jitter on the beams from the BIL 215 and the HEL 205. In the tip-tilt correction loop 306, the controller 230 generates an input for the autoregressive model. The input to the autoregressive model establishes where to point the BIL spot 245. As the BIL spot 245 illumination is transmitted by the BIL 215, the illumination is subject to atmospheric uplink jitter 316. The atmospheric uplink jitter 316 is reflected in movement of the BIL spot 245 from an expected location to a true location. An uplink and downlink time delay 318 of the BIL spot 245 is a measure of the inherent speed-of-light time delay in the uplink for the spot 245 to reach the target 240 and return back to the sensor. The BIL processing algorithm 320 receives the image of the BIL spot 245 from the camera 220 and predicts the uplink jitter of the HEL beam from the HEL 205 at the time at which the light reaches the target. The prediction results in jitter compensation, which includes movement of the FSM 226.

Figure 4:
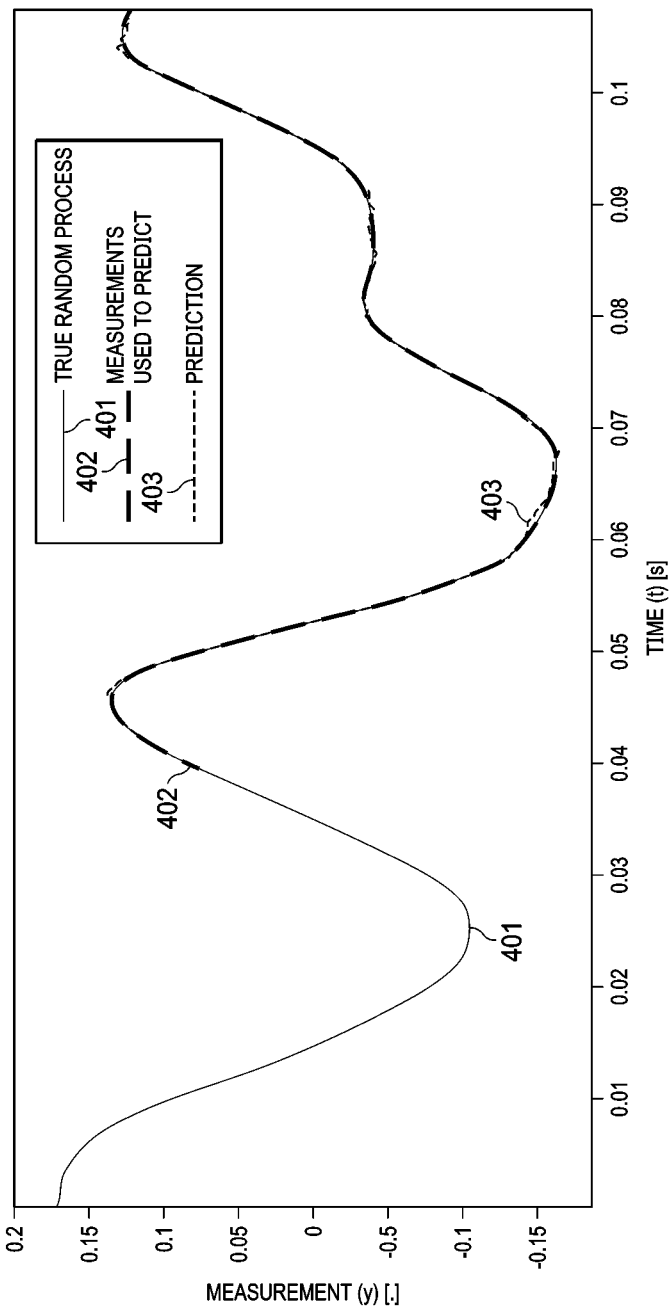
FIG. 4 illustrates use of autoregressive model prediction for uplink atmospheric jitter, according to this disclosure.

FIG. 4 illustrates use of autoregressive model prediction for the uplink jitter caused by optical turbulence in the atmosphere, such as described above. Autoregressive model prediction with sufficient temporal sampling can accurately predict ahead for the uplink jitter and the uplink time delay. As shown in FIG. 4, the plot 401 illustrates a true random process over time, such as atmospheric optical turbulence. The dashed plot 402 illustrates measurements used for prediction. The plot 403 shows the actual prediction that is determined from the measurements. It is clear that the actual prediction plot 403 correlates closely with the random process plot 401. Of course, autoregressive model prediction is just one option for prediction. Other suitable prediction methods could also be used, including Markoff prediction, machine learning prediction, and the like. In simulation tests, use of prediction and compensation techniques for uplink atmospheric jitter, such as described above, reduced the sigma value from 2.64 microradians to 0.15 microradians, which represents an approximately 17× improvement over no correction.

Figure 5:
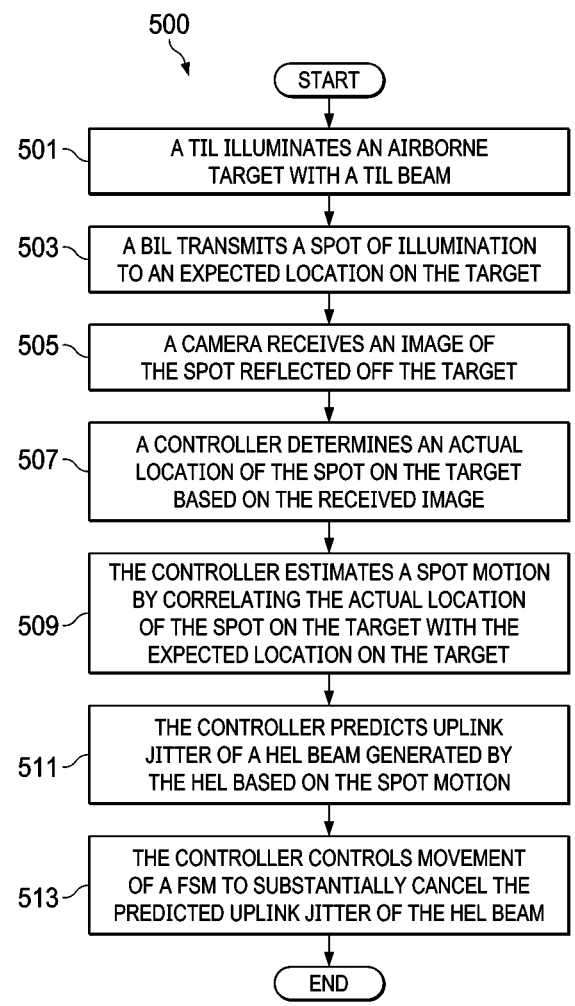
FIG. 5 illustrates an example method for predicting and compensating for the uplink atmospheric jitter of a high energy laser beam according to this disclosure.

FIG. 5 illustrates an example method 500 for predicting and compensating for the uplink atmospheric jitter of a high energy laser beam according to this disclosure. For ease of explanation, the method 500 is described as being performed using the system 200 of FIG. 2. However, the method 500 could be used with any other suitable device or system.

At step 501, a TIL illuminates an airborne target with a TIL beam. This may include, for example, the TIL 210 illuminating the target 240 with the TIL beam 235.

At step 503, a BIL transmits a spot of illumination to an expected location on the target. The spot of illumination is more focused than the TIL beam. This may include, for example, the BIL 215 transmitting the spot 245 to an expected location on the target 240.

At step 505, a camera receives an image of the spot reflected off the target. This may include, for example, the camera 220 receiving an image of the spot 245 reflected off the target 240. In some embodiments, the camera is a high-speed SWIR camera co-boresighted with a HEL. In some embodiments, the TIL beam and the spot of illumination are at different wavelengths, and the camera receives both the image of the spot and an image of the target illuminated by the TIL beam.

At step 507, a controller determines an actual location of the spot on the target based on the received image. This may include, for example, the controller 230 determining an actual location of the spot 245 on the target 240 based on the received image.

At step 509, the controller estimates a spot motion by correlating the actual location of the spot on the target with the expected location on the target. This may include, for example, the controller 230 estimating a spot motion by correlating the actual location of the spot 245 on the target 240 with the expected location on the target 240. In some embodiments, the spot motion is estimated relative to one or more identified features on the target.

At step 511, the controller predicts uplink jitter of a HEL beam generated by the HEL based on the spot motion, where the uplink jitter is caused by atmospheric optical turbulence. This may include, for example, the controller 230 predicting uplink jitter of a HEL beam generated by the HEL 205 based on the spot motion. In some embodiments, the uplink jitter is predicted by taking into account a round trip speed-of-light delay of the spot of illumination and an operational delay of a FSM servo associated with the FSM.

At step 513, the controller controls movement of a FSM to substantially cancel the predicted uplink jitter of the HEL beam. This may include, for example, the controller 230 controlling movement of the FSM 225.

Although FIG. 5 illustrates one example of a method 500 for predicting and compensating for the uplink atmospheric jitter of a high energy laser beam, various changes may be made to FIG. 5. For example, while shown as a series of steps, various steps shown in FIG. 5 could overlap, occur in parallel, occur in a different order, or occur multiple times. Moreover, some steps could be combined or removed and additional steps could be added according to particular needs.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," or "system" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system comprising:
   a target illumination laser (TIL) configured to illuminate an airborne target with a TIL beam;
   a beacon illuminator (BIL) configured to transmit a spot of illumination to an expected location on the target, wherein the spot of illumination is more focused than the TIL beam;
   a high energy laser (HEL) configured to transmit a HEL beam directed toward the target;
   a camera configured to receive an image of the spot reflected off the target; and
   a controller configured to:
      determine an actual location of the spot on the target based on the received image;
      estimate a spot motion by correlating the actual location of the spot on the target with the expected location on the target; and
      predict uplink jitter of the HEL beam based on a combination of (i) the spot motion, (ii) a round trip speed-of-light delay of the spot, and (iii) an operational delay of a fast steering mirror (FSM) servo associated with at least one FSM, the uplink jitter caused by atmospheric optical turbulence;
   wherein the TIL, the BIL, and the HEL comprise different light sources.

2. The system of claim 1, wherein the controller is further configured to control movement of the at least one FSM to substantially cancel the predicted uplink jitter of the HEL beam.

3. The system of claim 1, wherein the controller is configured to predict the uplink jitter using an autoregressive input-output model.

4. The system of claim 1, wherein the camera is a high-speed short wave infrared (SWIR) camera co-boresighted with the HEL.

5. The system of claim 1, wherein:
   the TIL beam and the spot of illumination are at different wavelengths; and
   the camera is configured to receive both the image of the spot and an image of the target illuminated by the TIL beam.

6. The system of claim 1, wherein the controller is configured to estimate the spot motion relative to one or more identified features on the target.

7. The system of claim 6, wherein the one or more identified features on the target comprise a feature on a nose of the target.

8. The system of claim 1, wherein the controller is configured to estimate the spot motion using an image processing algorithm.

9. The system of claim 1, wherein the TIL beam illuminates the target in a short wave infrared (SWIR) band.

10. A method comprising:
    illuminating an airborne target with a target illumination laser (TIL) beam using a TIL;
    transmitting a spot of illumination to an expected location on the target using a beacon illuminator (BIL), wherein the spot of illumination is more focused than the TIL beam;
    transmitting a high energy laser (HEL) beam directed toward the target using a HEL;
    receiving, at a camera, an image of the spot reflected off the target;
    determining an actual location of the spot on the target based on the received image;
    estimating a spot motion by correlating the actual location of the spot on the target with the expected location on the target; and
    predicting uplink jitter of the HEL beam based on a combination of (i) the spot motion, cii) a round trip speed-of-light delay of the spot, and (iii) an operational delay of a fast steering mirror (FSM) servo associated with at least one FSM, the uplink jitter caused by atmospheric optical turbulence;
    wherein the TIL, the BIL, and the HEL comprise different light sources.

11. The method of claim 10, further comprising:
    controlling movement of the at least one FSM to substantially cancel the predicted uplink jitter of the HEL beam.

12. The method of claim 10, wherein the uplink jitter is predicted using an autoregressive input-output model.

13. The method of claim 10, wherein the camera is a high-speed short wave infrared (SWIR) camera co-boresighted with the HEL.

14. The method of claim 10, wherein:
    the TIL beam and the spot of illumination are at different wavelengths; and
    the camera receives both the image of the spot and an image of the target illuminated by the TIL beam.

15. The method of claim 10, wherein the spot motion is estimated relative to one or more identified features on the target.

16. The method of claim 15, wherein the one or more identified features on the target comprise a feature on a nose of the target.

17. The method of claim 10, wherein the spot motion is estimated using an image processing algorithm.

18. The method of claim 10, wherein the TIL beam illuminates the target in a short wave infrared (SWIR) band.

19. The system of claim 1, wherein the controller is configured to predict the uplink jitter using a machine learning prediction model.

20. The method of claim 10, wherein the uplink jitter is predicted using a machine learning prediction model.

* * * * *